(12) United States Patent
Yu et al.

(10) Patent No.: US 9,848,000 B2
(45) Date of Patent: Dec. 19, 2017

(54) RESOURCE ACCESS

(71) Applicant: Hewlett-Packard Development Company L.P., Houston, TX (US)

(72) Inventors: Zhi-Wei Yu, Shanghai (CN); Matthieu Clemenceau, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/787,055

(22) PCT Filed: Apr. 28, 2013

(86) PCT No.: PCT/CN2013/074956
§ 371 (c)(1),
(2) Date: Oct. 26, 2015

(87) PCT Pub. No.: WO2014/176727
PCT Pub. Date: Nov. 6, 2014

(65) Prior Publication Data
US 2016/0105443 A1    Apr. 14, 2016

(51) Int. Cl.
*H04L 29/06* (2006.01)
*G06F 9/44* (2006.01)
*G06F 9/445* (2006.01)

(52) U.S. Cl.
CPC .......... *H04L 63/102* (2013.01); *G06F 9/4445* (2013.01); *G06F 9/44505* (2013.01); *H04L 63/083* (2013.01)

(58) Field of Classification Search
CPC .................................................. H04L 63/102
See application file for complete search history.

(56) References Cited

U.S. PATENT DOCUMENTS

| 6,529,910 | B1* | 3/2003 | Fleskes | G06F 17/3089 |
| | | | | 707/770 |
| 7,546,373 | B2 | 6/2009 | Lehew et al. | |
| 8,364,845 | B2 | 1/2013 | Richter | |
| 8,549,595 | B1* | 10/2013 | Vaisman | G06F 21/316 |
| | | | | 713/152 |
| 2004/0158746 | A1 | 8/2004 | Hu et al. | |
| 2005/0201345 | A1 | 9/2005 | Williamson | |

(Continued)

FOREIGN PATENT DOCUMENTS

CN    101369272 A    2/2009

OTHER PUBLICATIONS

Network Guide, Increase Availability and Secure Access of Enterprise Applications Using Citrix Presentation Server with F5's BIG-IP and FirePass Solutions, pp. 1-2.

(Continued)

*Primary Examiner* — Shawnchoy Rahman
(74) *Attorney, Agent, or Firm* — HP Inc. Patent Department (57) ABSTRACT

An example method for accessing a target resource in accordance with aspects of the present disclosure includes retrieving a configuration from a local profile associated with a user on a device, automatically completing a login form for a web interface based on the configuration, identifying a target resource by parsing a list of resources received from a server in response to the completed login form, and automatically launching the identified target resource based on the configuration.

20 Claims, 4 Drawing Sheets

(56) References Cited

U.S. PATENT DOCUMENTS

| | | | |
|---|---|---|---|
| 2008/0066020 A1* | 3/2008 | Boss | G06F 17/243 |
| | | | 715/780 |
| 2011/0246904 A1 | 10/2011 | Pinto et al. | |
| 2012/0151365 A1 | 6/2012 | Tam | |
| 2012/0260321 A1 | 10/2012 | Wendt et al. | |
| 2013/0066945 A1 | 3/2013 | Das et al. | |
| 2014/0164774 A1* | 6/2014 | Nord | G06F 21/602 |
| | | | 713/171 |

OTHER PUBLICATIONS

PCT Search Report/Written Opinion~Application No. PCT/CN2013/074956 dated Jan. 30, 2014~14 pages.

XenDesktop Worker Unregisters at Session Launch, Document ID: CTX132536, Mar. 5, 2012, pp. 1-2, Citrix Systems, Inc., support.citrix.com/article/ctx132536.

* cited by examiner

RESOURCE ACCESS

BACKGROUND

Users of the World Wide Web commonly use browsers (web browsers) implemented on web-enabled computing devices to access content. Such devices include personal computers, laptop computers, netbook computers, smartphones and cell phones, among a number of other possible devices including thin client systems. Thin client systems are server-centric systems in which applications and data are centrally hosted on at least one server. Thin client devices access the applications and data using a minimal amount of software and hardware. The most common type of modern thin client is a low-end computer terminal which concentrates solely on providing a graphical user interface to the end-user. The remaining functionality, in particular the operating system, is provided by the server.

Some browsers allow users to install plug-ins, add-ons, or extensions to the browser, where such extensions add functionality to the browser and operate as an integrated part of the browser. For instance, an extension may provide a user access to its additional functionality by modifying a user-interface (UI) of the browser.

A desktop virtualization technology has developed with companies such as Citrix, VMware, etc., that have published desktop virtualization solutions that link the thin client on the desktop to its own virtual machine that is located on the server.

Web Interfaces in browsers provide users with access to desktop virtualization applications, such as virtual desktops. Users access their resources through a standard Web browser or through the plug-ins, such as Citrix online plug-in. For example, for a user using Citrix applications, the Web Interface provides secure access to XenApp and XenDesktop resources through a web-enabled computing device with a web browser.

BRIEF DESCRIPTION OF THE DRAWINGS

Example implementations are described in the following detailed description and in reference to the drawings, in which.

DETAILED DESCRIPTION

Various implementations described herein are directed to a web interface solution for a desktop virtualization application. More specifically, and as described in greater detail below, various aspects of the present disclosure are directed to a manner by which the login process for desktop virtualization application is automated through a browser extension and the target resources are accessed directly.

Aspects of the present disclosure described herein automate a web interface login via caching and provisioning a user's credentials through a Citrix Web Interface to achieve secure login. According to various aspects of the present disclosure, the approach described herein allows a user to securely login from any device without having to enter user credentials manually. Moreover, aspects of the present disclosure described herein also automatically launch a user's target resource. Among other things, this approach may help simplify the interaction process and prevent the user from having to select the target resources to connect to manually.

In one example in accordance with the present disclosure, a method for accessing a target resource is provided. The method comprises retrieving, by a browser extension, a configuration from a local profile associated with a user on a device, the browser extension installed on the device, automatically completing, by the browser extension, a login form for a web interface based on the configuration, identifying, by the browser extension, a target resource by parsing a list of resources received from a server in response to the completed login form, and automatically launching, by the browser extension, the identified target resource based on the configuration.

In another example in accordance with the present disclosure, a non-transitory computer-readable medium is provided. The non-transitory computer-readable medium comprises instructions that when executed cause a device to (i) retrieve a configuration from a local profile associated with a user on a device, the browser extension installed on the device, (ii) automatically complete a login form for a web interface based on the configuration, (iii) identify a target resource by parsing a list of resources received from a server in response to the completed login form, and (iv) automatically launch the identified target resource based on the configuration.

In a further example in accordance with the present disclosure, a system is provided. The system comprises a web browser extension communicatively coupled to a web browser to retrieve a configuration from a local profile associated with a user, automatically log in to a web interface by completing a login form for a web interface based on the configuration, identify a target resource by parsing a list of resources received in response to the completed login form, and automatically launch the identified target resource based on the configuration, and a desktop delivery controller to authenticate the user during login to the web interface and to provide the list of resources.

Figure 1:
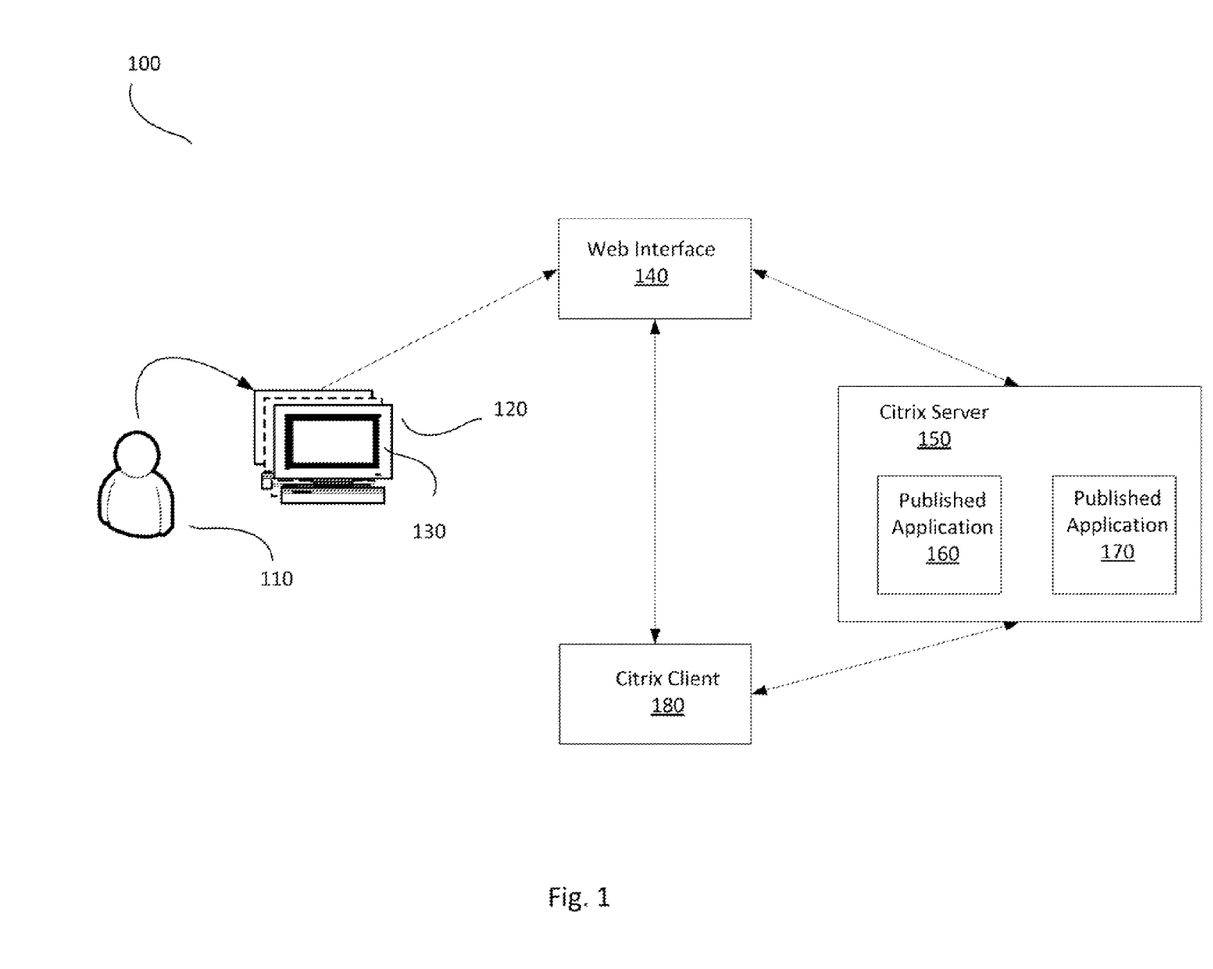
FIG. 1 illustrates an example system in accordance with an implementation.

FIG. 1 illustrates an example system 100 in accordance with an implementation. The system 100 comprises a computing device 120 which is used or operated by a user 110, with a user interface 130, web interface 140, Citrix server 150 with published applications 160 and 170, Citrix client 180, each of which is described in greater detail below. More specifically, this diagram illustrates a computing device 120 using a Citrix online plug-in to connect to a Citrix server farm 150 through a web interface 140 and access published applications 160 and 170 in the Citrix server 150. It should be readily apparent that the system 100 depicted in FIG. 1 represents a generalized illustration and that other components may be added or existing components may be removed, modified, or rearranged without departing from a scope of the present disclosure. For example, while the system 100 illustrated in FIG. 1 includes two published applications, the system may actually comprise less or more than two published applications, and two have been shown and described for simplicity.

The computing device 120 may be a user device. It should be noted that the device 120 is intended to be representative of a broad category of data processors. In one implementation, the device 120 may include any type of processor, memory or display. Additionally, the elements of the device 120 may communicate via a bus, network or other wired or wireless interconnection. As non-limiting examples, the device 120 may be any type of personal computer, portable computer, workstation, personal digital assistant, video game player, communication device (including wireless phones and messaging devices), media device, including recorders and players (including televisions, cable boxes, music players, and video players) or other device capable of accepting input from a user and of processing information.

In some implementations, a user 110 may interact with the device 120 by controlling a keyboard (not shown), which may be an input device for the device 120. The user may perform various gestures on the keyboard 130. Such gestures may involve, but not limited to, touching, pressing, waiving, placing an object in proximity.

In one implementation, the user interface 130 may be a display of the device 120. The user interface 130 may refer to the graphical, textual and auditory information a computer program may present to the user 110, and the control sequences (such as keystrokes with the computer keyboard) the user 110 may employ to control the program. In one example system, the user interface 130 may present various pages that represent applications available to the user 110. The user interface 130 may facilitate interactions between the user 110 and computer systems by inviting and responding to user input and translating tasks and results to a language or image that the user 110 can understand. In another implementation, the device 120 may receive input from a plurality of input devices, such as a keyboard, mouse, touch device or verbal command.

In one implementation, one of the applications available to the user 110 may be a browser application. The device 120 may run a web browser, and the user 110 may interact with the web browser, which will be furthered explained in reference to FIG. 2. In one implementation, the device 120 may run a browser using a plug-in. For example, the plug-in may be a Citrix online plug-in, which may be run on a browser supported by the device 120.

In one implementation, the device 120 may interact with a server device (e.g., the Citrix serve 150) running at least one application (e.g., published applications 160 and 170). When installed on the device 120, a Citrix online plug-in enables the user 110 to access the published applications 160 and 170 in the Citrix server 150 through the web interface 140.

In one implementation, an independent computing architecture (ICA) protocol may be used to exchange information between the device 120 and the published resources 160 and 170 on the Citrix server 150. More specifically, the ICA protocol may send keyboard and mouse activity and screen updates between the Citrix server 150 and the web interface 140, which is linked to the device 120 through the web browser.

In one implementation, the user 110 may initiate a process to access a Citrix web interface 140. The user 110 may authenticate to the web interface 140 through a web browser. At the web interface logon, the user may get prompted to enter credentials (e.g., username, password, and domain) through the web browser. The web interface 140 may read the user's credentials and forward the information to a Citrix XML service (not shown) in the Citrix Server 150. The Citrix XML service on the server 150 may retrieve a list of resources that the user 110 can access. These resources may comprise the user's resource set. The Citrix XML service may then return the user's resource set information to the web interface 140 running on the server. The user 110 may click an icon that represents a resource on the HTML page. In one implementation, the Citrix XML service may be contacted to identify the least busy server in the Citrix server 150 and return the address of this server to the web interface 140.

In one implementation, the web interface 140 may communicate with the Citrix client 180 (in some cases using the browser as an intermediary). The Citrix client 180 may initiate a session with the server in the Citrix server 150 according to the connection information supplied by the web Interface 140. Once the connection to the Citrix server 150 is established, the user 110 may access the resource. Further, the device 120 may display output produced in the browser window (e.g., the user interface 130).

Figure 2:
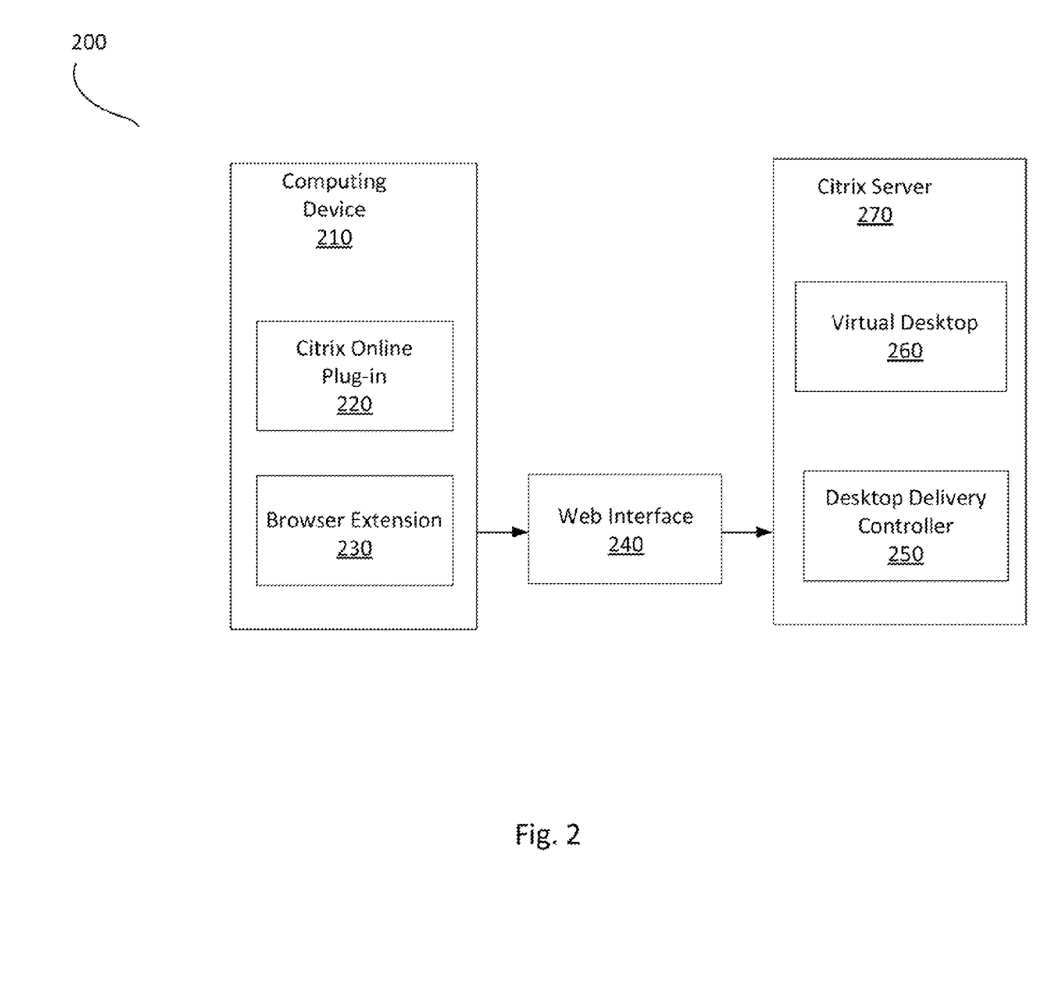
FIG. 2 illustrates example components of an example system in accordance with an implementation.

FIG. 2 illustrates an example system 200 in accordance with an implementation, illustrating how a browser may interact with an application through a web browser extension. The system 200 comprises a computing device 210 with a Citrix online plug-in 220, a browser extension 230, a web interface 240, a Citrix server 270 comprising a desktop delivery controller 250 and a virtual desktop 260, each of which is described in greater detail below. It should be readily apparent that the system 200 depicted in FIG. 2 represents a generalized illustration and that other components may be added or existing components may be removed, modified, or rearranged without departing from a scope of the present disclosure. For example, while the system 200 illustrated in FIG. 2 includes one virtual desktop, the system may actually comprise a plurality of virtual desktops, and one has been shown and described for simplicity.

In one implementation, the device 210, similar to the device 120 discussed in more detail above in reference to FIG. 1, may be any type of personal computer, portable computer, workstation, personal digital assistant, video game player, communication device (including wireless phones and messaging devices), media device, including recorders and players (including televisions, cable boxes, music players, and video players) or other device capable of accepting input from a user and of processing information. In another implementation, the device 210 may include a browser logic that provides a base amount of browser functionality. The device 210 may also include an extension logic to facilitate having browser logic interact with a web browser extension 230. In one implementation, the web browser extension 230 may be a code package that may be installed into a browser and/or user device (e.g., the device 210) running a browser. The browser extension 230 may add a new feature to the browser, extend an existing functionality, modify a visual theme, and so on. The browser extension 230 may provide additional functionality to browser logic. Output from the browser logic and the browser extension 230 may be merged onto a browser window.

In one implementation, the browser extension 230 may be a combination of a form capture extension and a form-fill extension that together mitigate issues associated with repetitive form entry. In another implementation, the browser extension 230 may be embodied as software. Once installed on the device 210, the browser extension 230 may logically and/or physically become part of the browser logic.

The browser extension 230 may include web form capture logic. In one example, the browser extension 230 may include logics to capture available editable fields on webpages and framesets within webpages, to present the captured fields to a user for editing, to store field data under a template name and to associate the template to the user and/or webpage, to retrieve saved field data, to apply the retrieved field data back into associated form fields on a webpage, and so on. In another implementation, the logic may perform a capture function to parse a webpage. When a user visits a webpage in which data values are to be input into form fields, the capture function may be initiated to parse the web page. In one example, the web form capture logic may parse the webpage to identify editable sections.

In one implementation, the browser extension 230 may be implemented using programmatic code that is written using the same programming language that is used for implementing webpages.

In this context, a webpage may include a file or document which is a portion of a web site, may include a collection or grouping of related web pages that are generally viewable or understandable (once rendered by the web browser) to a user (e.g., the user 110 as discussed above in more detail in reference to FIG. 1). In various implementations, such webpages may include a file formatted as Hypertext Markup Language (HTML), Cascading Style Sheets (CSS), JavaScript, Extensible Markup Language (XML) such as a XHTML (Extensible HyperText Markup Language) file, an Adobe Flash file, images, videos, etc. In various implementations, the web browser may process one or more web pages in order to render one web page. For example, an HTML web page may be modified or include other web pages, such as, JavaScripts, a CSS file, various images, etc. It should be noted that the above is merely one illustrative example to which the disclosed subject matter is not limited.

In various implementations, when the webpages are accessed via a communications network, the web site may be accessed via the Hypertext Transfer Protocol (HTTP) or Hypertext Transfer Protocol Secure (HTTPS).

As discussed in more detail in reference to FIG. 1, the web browser extension 230 may read a configuration from a user's local profile during its initiation. Such configuration may include the user's credentials and target resources. In one implementation, a graphical user interface (GUI) configuration tool can be a local application. The GUI configuration tool may be executed locally, and the configuration may be saved in a local profile. In one implementation, attributes such as URL of Citrix web interface, username, password, domain, target resources and other login options may be configured. In one implementation, the other login option may comprise an option to disable user input. In another implementation, the other login option may comprise an option to allow the caching user credentials from the user input.

The user's local profile may include historical data stored from the user's previous logins. Such historical data may be stored in a registry in the device 210. In one implementation, such historical data may be stored in encrypted format. Further, the configuration may be read directly by the web browser extension 230.

In another implementation, the GUI configuration tool may be an application in the central management tool of the device 210, and may be configured in the central management tool. A profile may be created on another computer by an administrator. Moreover, the administrator may either copy and import the profile to the client 210, or push the profile to the device 210 using an auto update tool. Accordingly, the user may not need to control or provide the user credentials and target resources.

In one implementation, the browser extension 230 may be installed with the Citrix online plug-in 220. The Citrix online plug-in 220 may be required to access remote applications. In one implementation, the Citrix online plug-in 220 may be installed to access portal through a browser such as Apple Safari, Google Chrome, or Mozilla Firefox. The Citrix online plug-in 220 may be added to the browser to provide additional functionality. A plug-in may be any type or form of executable code, software, application, program, widget and/or application plug-in. For example, in the context of a particular vendor or provider environment (e.g., CITRIX), an application receiver can manage the operation of plug-ins of that vendor or provider. More specifically, the application receiver may be a device and/or component that supports, organizes, updates, configures and/or otherwise manages an end user desktop (e.g., the device 210) and/or its associated plug-ins (e.g. the Citrix online plug-in 220).

In some implementations, the application receiver can provide application access from any computer. The application receiver may utilize any type of access or connection system for access to applications or plug-ins. In one implementation, the application receiver may be installed within a company or system firewall. In another implementation, the application receiver may be installed outside of a company or system firewall.

In one implementation, the browser extension 230 is installed together with the Citrix online plug-in 220 on the device 210, which may be a thin client. When installed on the device 210, this Citrix online plug-in 220 enables the user to access the virtual desktop 260. In one implementation, a user may connect to target published applications by using the Citrix online plug-in software. The plug-in software may be available for a range of different devices so users can connect to target published applications from various platforms. The Citrix online plug-in 220 may be deployed and updated using the Citrix application receiver.

In one implementation, the virtual desktop 260 may be an individual user's interface in a virtualized environment. In some implementations, the virtual desktop 260 may be stored on a remote server (e.g., the Citrix server). In other implementations, the virtual desktop 260 may be stored locally. In another implementation, on a single host machine, a user may have separate virtual desktops for different applications. More specifically, the virtual desktop 260 may feature applications for graphic design, and another virtual desktop may feature business applications.

In one implementation, the web interface 240 may be similar to the web interface 140 in FIG. 1. Accordingly, as discussed above in more detail with respect to the web interface 140 in FIG. 1, a user may launch a web browser to access the Citrix web interface 240. The user may authenticate to the web interface 240 through the web browser. At the web interface log-in, the user may get prompted to enter credentials (e.g., username, password, and domain) through the web browser. More specifically, the user may be required to log in by supplying a user name and password. In one implementation, such information supplied by the user may be stored in a registry, which may be a hierarchical database that stores configuration settings and options on an operating system. Alternatively or in addition, the registry may be used for applications running on the operating system that have opted to use the registry.

In another implementation, at the web interface log-in, the web browser may establish an http/https connection to the Citrix web interface 240, and the web browser extension 230 may parse the login form and may automatically enter the user credentials into the login form. The web browser extension 230 may read the necessary information from the registry. Based on the information entered by the web browser extension 230, the user authentication may be performed.

Communication between the web Interface 240 and the Citrix server 270 running the virtual desktop 260 may involve passing user credential and resource set information between the web interface 240 and the Citrix server 270. In a typical session, the web interface 240 may pass credentials for user authentication and in response, the resource set information may be returned. In one implementation, the desktop delivery controller 250 may be utilized for enable the communication between the web Interface 240 and the Citrix server 270 running the virtual desktop 260.

In some implementations, the desktop delivery controller 250 may be utilized to authenticate the user during the login process. The desktop delivery controller 250 may guarantee the authenticity and confidentiality of communication between the web interface 240 and the Citrix server 270. The desktop delivery controller 250 may require that the device 210 connected to the Citrix server is a member of a domain, with mutual trusting relationships between the domain used by the desktop delivery controller 250 and the domain used by the virtual desktop 260. In one implementation, the desktop delivery controller 250 may use the services provided by an active directory, which may be used to assign and enforce security policies for all computers and installing or updating software. For example, when a user logs into a computer, the active directory may check the submitted password and determine whether the user is a system administrator or normal user. More specifically, if authentication is successful, the user's resource set may appear, and the user may access resources (applications, content, and desktops). In some implementations, user principal name (UPN), Microsoft domain-based authentication, and Novell Directory Services (NDS) may be used as authentication techniques. In other implementations, RSA SecurID and SafeWord authentication may be also used.

In one implementation, a user may be authenticated based on the credentials the user may provide during the log-in process to the device 210 (e.g., a Windows desktop). Accordingly, the user may not need to reenter the credentials. In another implementation, the user may be authenticated based on the credentials the user may have provided during the log-in process to the web interface 240 in the past and such information may be pulled from the registry.

Further, the desktop delivery controller 250 may provide a list of available target resources. In one implementation, the resource set may appear automatically based on the information provided by the user during the log-in process. More specifically, once the user passes through the log-in process, all the available applications may be displayed. Further, the user may choose to click on an application, and in response, the system may launch the application (e.g., the virtual desktop 260) immediately with no further prompts. The information related to the user's selection of a specific application may be stored in the registry along with the user's credentials.

In another implementation, the target resource may be identified in the browser extension 230 through the information pulled from the registry, and accordingly, the target resource (e.g., the virtual desktop 260) may automatically be launched without the user's selection of the application. More specifically, once the user passes through the log-in process, the web browser extension 230 may parse the page listing all the available applications to identify the target resource (e.g., the virtual desktop 260). Moreover, the web browser extension 230 may automatically launch the target resource. Accordingly, the web browser extension 230 may automate the process.

Figure 3:
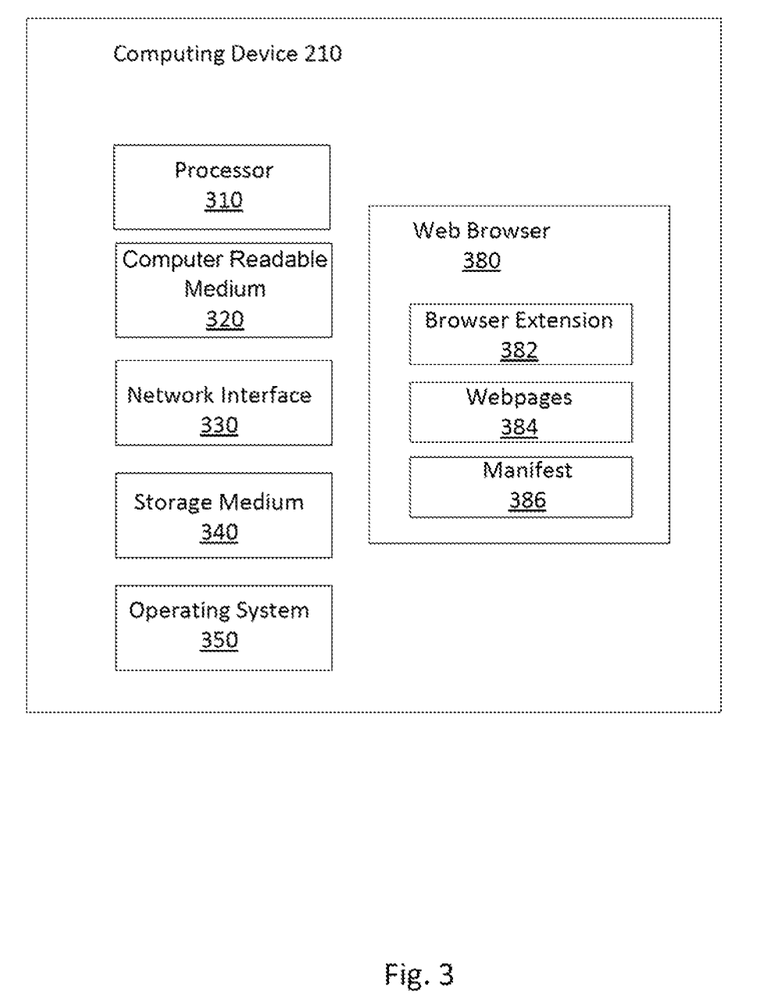
FIG. 3 illustrates example components of an example system in accordance with an implementation.

FIG. 3 illustrates example components of the device 210 in accordance with an implementation. It should be readily apparent that the device 210 illustrated in FIG. 3 represents a generalized depiction and that other components may be added or existing components may be removed, modified, or rearranged without departing from a scope of the present disclosure. The device 210 comprises a processor 310, a computer readable medium 320, a network interface 330, a storage medium 340, an operating system 350, a web browser 380 including a browser extension 382, webpages 384 and a manifest 386, each of which is described in greater detail below. The components of the device 210 may be connected via buses. The computer readable medium 320 may comprise various databases containing, for example, user profile data and domain data.

The processor 310 may retrieve and execute instructions stored in the computer readable medium 320. The processor 310 may be, for example, a central processing unit (CPU), a semiconductor-based microprocessor, an application specific integrated circuit (ASIC), a field-programmable gate array (FPGA) configured to retrieve and execute instructions, other electronic circuitry suitable for the retrieval and execution instructions stored on a computer readable storage medium, or a combination thereof. The processor 310 may fetch, decode, and execute instructions stored on the storage medium 320 to operate the device 210 in accordance with the above-described examples. The computer readable device 320 may be a non-transitory computer-readable medium that stores machine readable instructions, codes, data, and/or other information.

In certain implementations, the computer readable medium 320 may be integrated with the processor 310, while in other implementations, the computer readable medium 320 and the processor 310 may be discrete units.

Further, the computer readable medium 320 may participate in providing instructions to the processor 310 for execution. The computer readable medium 320 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices.

In one implementation, the computer readable medium 320 may have a user profile database. The user database may store user profile data such as user authentication data, user interface data, and profile management data and/or the like. In one implementation, user authentication data may comprise (i) username, (ii) authorization information (e.g., unauthorized, authorized, forbid/blocked, guest, or quarantined), and/or (iii) security keys (e.g., 1a2b3c4d).

In some implementations, the computing device 210 may include one or more network interfaces 330 configured to associate with and communicate via one or more communication networks (e.g., a wired network, a wireless network, a cellular network, etc.). In various implementations, the computing device 210 may include a storage medium 340 configured to store data in a semi-permanent or substantially permanent form. In various implementations, the storage medium 340 may be included by the computer readable medium 320. In various implementations, the computing device 210 may include one or more other hardware components (not shown) (e.g., a display or monitor, a keyboard, a touchscreen, a camera, a video processor, etc.).

In various implementations, the computing device 210 may include an operating system (OS) 350 to provide one or more services to an application and manage or act as an intermediary between the applications and the various hardware components (e.g., the processor 310, the network interface 330, etc.) of the computing device 210.

As described in more detail in reference to FIG. 2, the computing device 210 may include a web browser 380 configured to access a web site or a collection of webpages, scripts, etc. from a physically remote server or web server. In various implementations, the web browser 380 may include or be configured to interact with one or more browser extensions. In this context, the browser extension 382 may include one or more web pages (e.g., the webpages 384, etc.) packaged or grouped together as a definable whole, and configured to add functionality to the web browser 380. In one implementation, the browser extension 382 may add functionality by communicating with a server (e.g., Citrix server) and updating or altering the user interface (UI) of the web browser 380.

In one implementation, the web browser extension 382 may be packaged as an installable entity. In this context, "installation" includes the act of placing semi-permanently or substantially permanently one or more files (e.g., the manifest 386, webpages 384, etc.) on the computing device 210 for later execution or processing.

In various implementations, the user 110 may select a browser extension (e.g., the browser extension 382) to download and locally install on the computing device 210. In such an implementation, the web browser 380 may download the browser extension 382 and either store it locally in the packaged format, or un-package or decompress the browser extension into a predetermined location (e.g., a browser extension portion of a file system in the storage medium 340, etc.). In one implementation, the browser extension 382 may include a metadata file or manifest 386 which includes information detailing or dictating how the web browser 380 may be processed or managed the browser extension 382 and/or what the contents of the installable browser extension 382 may be.

Further, in various implementations, the manifest 386 may include various fields or values indicating how the web browser 380 is to process or execute the browser extension 382.

In one implementation, the web browser 380 may allow the browser extension 382 access to permissions or functionality not provided to a remote web site. In such an implementation, the computing device 210 or the web browser 380 may include a permissions manager (not shown) configured to manage a user allowed permissions for various functionality features (e.g., access to the storage medium 340, etc.) of the computing device 210. In such an implementation, the browser extension 382 may indicate (e.g., via the manifest 386) that the browser extension 382 may require or desire permission to utilize one or more features associated with the device 210.

In one implementation, the processor 310 may be a processor for performing functions related to any encryption protocol, such as the Secure Socket Layer (SSL) or Transport Layer Security (TLS) protocol. More specifically, SSL and TLS may provide server authentication, encryption of the data stream, and message integrity checks and enable a user to deliver applications securely within a local area network or across the Internet.

In another implementation, an encryption engine may be present. The encryption engine may be in communication with the processor 310. More specifically, the encryption engine may comprise executable instructions running on the processor 310. The encryption engine may comprise any logic, business rules, functions or operations for handling the processing of any security related protocol, such as SSL or TLS, or any function related thereto. For example, the encryption engine encrypts and decrypts network packets, or any portion thereof, communicated via the appliance 210.

The processor 310 may comprise at least one high-speed data processor adequate to execute program components for executing user and/or system-generated requests. In one implementation, the processor 310 may include a software module that processes the key strokes captured from the keyboard. This module may also be used to respond to the detection of the communication between the web browser 380 and the browser extension 382. Moreover, the processor 310 may also include a software module that works with the encryption engine to encrypt or decrypt user data (username, password, domain, etc.) received from the user.

As discussed in more detail above, the processor 310 may be in data communication with the computer readable medium 320, which may include a combination of temporary and/or permanent storage. The computer readable medium 320 may include program memory that includes all programs and software such as an operating system, user software component, and any other application software programs. The computer readable medium 320 may also include data memory that may include system settings, a record of user options and preferences, and any other data required by any element of the device 210.

Figure 4:
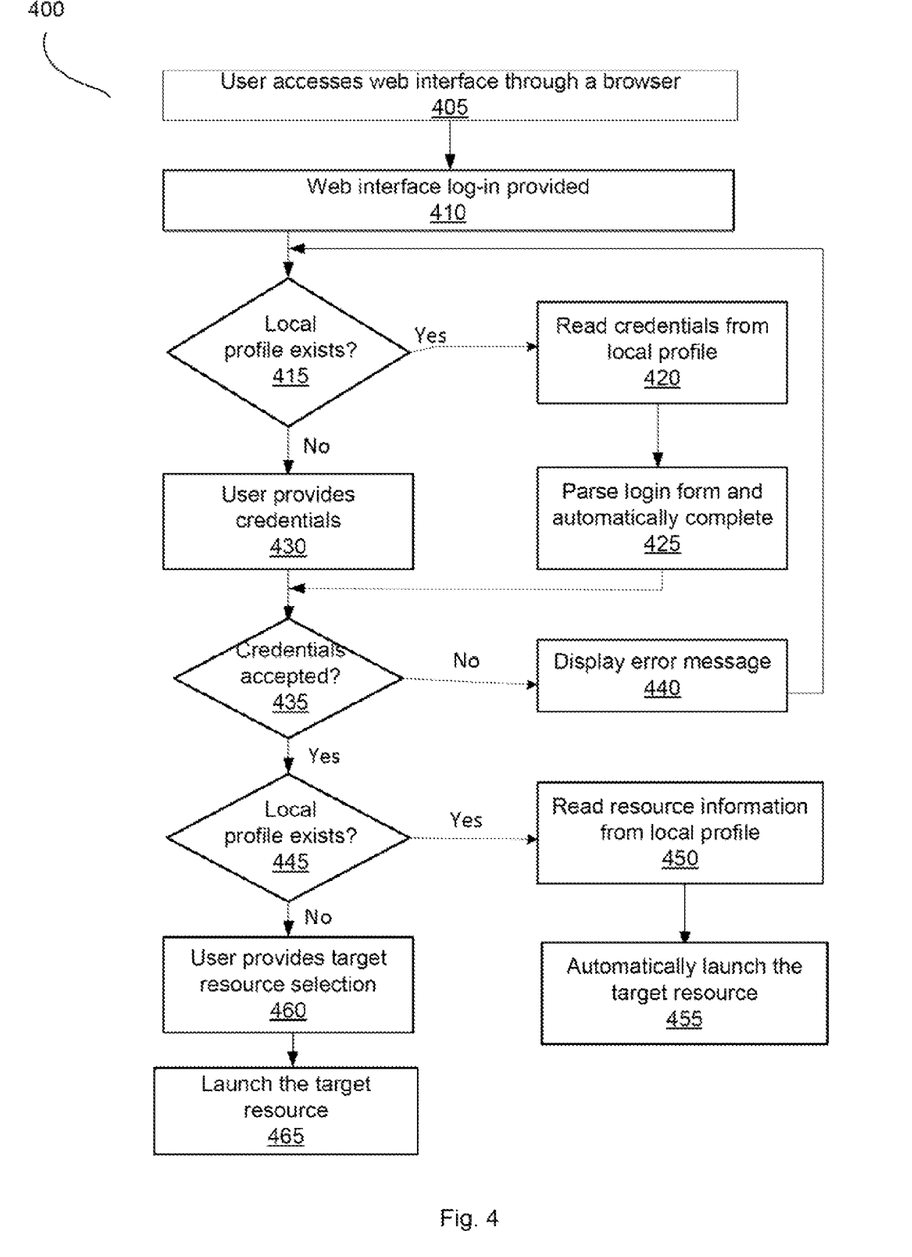
FIG. 4 illustrates an example process flow diagram in accordance with an implementation.

Turning now to the operation of the system 100, FIG. 4 illustrates an example process flow diagram 400 in accordance with an implementation. It should be readily apparent that the processes illustrated in FIG. 4 represents generalized illustrations, and that other processes may be added or existing processes may be removed, modified, or rearranged without departing from the scope and spirit of the present disclosure. Further, it should be understood that the processes may represent executable instructions stored on memory that may cause a processor to respond, to perform actions, to change states, and/or to make decisions. Thus, the described processes may be implemented as executable instructions and/or operations provided by a memory associated with a system 100. Furthermore, FIG. 4 is not intended to limit the implementation of the described implementations, but rather the figure illustrates functional information one skilled in the art could use to design/fabricate circuits, generate software, or use a combination of hardware and software to perform the illustrated processes.

The process 400 may begin at block 405, where the user launches a web browser on a device and initiates the process to access a Citrix web interface. In particular, the initiation process may involve, for example, launching a web browser session and entering the URL for Citrix web interface. This process may further involve the web browser establishing http/https connection with the web interface.

Once the connection between the browser and the web interface is established, at block 410, the web interface login page may be provided. More specifically, the log-in form may require that data related to the user's username, password, and domain be entered.

At block 415, the system proceeds to determine whether the user has a local profile on the device. In the event that a local profile for the user is identified, at block 420, the web browser extension reads the user's configuration from the user's local profile. As discussed above in more detail in reference to FIG. 2, the configuration includes user credentials and target resources. Moreover, as also discussed above in reference to FIG. 2, the local profile includes historical data from previous user logins. In one implementation, the configuration data may be stored in an encrypted format.

At block 425, the web browser extension parses the login form and automatically completes it based on the information read from the user's local profile, including the user's credentials. Accordingly, the user may not be required to reenter the credentials. This process may further involve submitting the form to a server (e.g., Citrix server) running published applications. Moreover, in one implementation, the web browser extension may be in Java script. In such implementation, the configuration may be stored in JavaScript Object Notation (JSON) format derived from the JavaScript scripting language for representing simple data structures.

In the event that no local profile is identified for the user, at block 430, the user is prompted to provide data, such as a username, password and domain. More specifically, the user is required to log in by supplying a user name, password and domain the user authenticates to the web interface through a web browser. The information provided by the user may be stored in a registry.

At block 435, the system proceeds to determine whether the user's credentials are accepted. In particular, this process may involve a desktop delivery controller authenticating the user during the login process. More specifically, this process may involve communications between the web interface and the server running published applications. The web server reads the user's credentials and forwards the information to a Citrix XML service in the Citrix server. For example, such communications may involve passing user credential and resource set information between the web interface and the Citrix XML service in the Citrix server farm. The web interface passes credentials to the Citrix XML service for user authentication.

In the event that the user's credentials are denied, at block 440, an authentication error may result in an error message. Further, this process involves the user being prompted for credentials at the web interface log-in. In particular, the process returns to block 415 and reinitiates the log-in attempts.

In the event that the user's credentials are accepted, at block 445, the system determines whether the target resource information exists in the local profile associated with the user. As part of the determination process, after the user is logged in, the Citrix XML service returns resource set information, and a web page displays all published resources. At block 450, if the user had a local profile, the web browser extension reads the user's configuration from the user's local profile and identified the target resources associated with the user.

At block 455, the web browser extension parses the page to identify the target resources. In one implementation, the target resource may be a published Citrix virtual desktop. Once target resource is found, the resource set for the user appears automatically, and the web browser extension automatically launches the target resource.

If the user does not have a local profile, at block 460, the user clicks an icon that represents a resource on the HTML page. The web interface communicates the user's selection of a resource to the Citrix client. In one implementation, the web interface may use the web browser as an intermediary. At block 465, the Citrix client initiates a session with the server according to the connection information supplied by the web interface. Further, this process may involve storing the resource information in the user's local profile. As discussed in detail in reference to FIG. 2, a graphical user interface (GUI) configuration tool may be a local application. If the GUI configuration tool is executed locally, the configuration is saved into the user's local profile, and it can be directly read by web browser extension the next time the user initiates a session to access a target resource.

The present disclosure has been shown and described with reference to the foregoing exemplary implementations. It is to be understood, however, that other forms, details, and examples may be made without departing from the spirit and scope of the disclosure that is defined in the following claims. As such, all examples are deemed to be non-limiting throughout this disclosure.

What is claimed is:

1. A method for accessing a target resource, comprising:
   retrieving, by a browser extension communicating with a server via a web interface and installed on a computing device, a configuration from a local profile associated with a user on a device,
   wherein the local profile comprises historical data from previous user logins to a web interface;
   automatically completing, by the browser extension, a login form for the web interface based on the local profile;
   in response to the automatic completion, receiving user authentication information including domain membership information from a desktop delivery controller associated with the server;
   identifying, by the browser extension, a target resource by parsing a list of resources received from a server in response to the completed login form and the authentication information;
   in response to the identification, determining, by the browser extension, whether the identified target resource exists in the local profile; and
   in response to the identified target resource existing in the local profile, automatically launching, by the browser extension, the identified target resource by reading the configuration and the identified target resource from the local profile,
   wherein the configuration comprises user credentials and target resources.

2. The method of claim 1, wherein the configuration comprises at least one login option.

3. The method of claim 1, wherein the user credentials comprise a username, password, and domain.

4. The method of claim 2, wherein the at least one login option comprises an option to disable user input or an option to allow the caching user credentials from the user input.

5. The method of claim 1, wherein the target resource comprises at least one of an application, content, and virtual desktop.

6. The method of claim 1, wherein the historical data comprises data provided by the user at previous log-ins to the web interface.

7. The method of claim 1, wherein the device comprises a thin client.

8. The method of claim 1, wherein automatically completing the login form for the web interface based on the configuration further comprises parsing the login form to identify fields to be completed.

9. The method of claim 7, wherein automatically completing the login form for the web interface based on the configuration further comprises completing the identified fields based on the configuration.

10. The method of claim 1, further comprises submitting the login form to the server, the login form providing user credentials to authenticate connection of the user to the web interface.

11. The method of claim 1, further comprising rejecting connection of the user to the web interface if an authentication error is identified based on the user credentials.

12. A system for accessing a target resource, comprising:
a computing device hosting a web browser extension, the web browser extension in communication with a server via a web interface and communicatively coupled to a web browser to:
retrieve a configuration from a local profile associated with a user,
wherein the local profile comprises historical data from previous user logins to a web interface;
automatically login to a web interface by completing a login form for the web interface based on the local profile;
in response to the automatic login, receive user authentication information including domain membership information from a desktop delivery controller associated with the server;
identify a target resource by parsing a list of resources received in response to the completed login form and the authentication information;
in response to the identification, determine whether the identified target resource exists in the local profile; and
in response to the identified target resource existing in the local profile, automatically launch the identified target resource by reading the configuration and the identified target resource from the local profile,
wherein the configuration comprises user credentials and target resources; and
a desktop delivery controller to authenticate the user during login to the web interface and to provide the list of resources.

13. The system of claim 11, wherein the web browser establishes http/https connection with the web interface.

14. The system of claim 11, further comprising a server having at least one published application corresponding to the target resource, wherein the at least one published application comprises a virtual desktop.

15. The system of claim 11, further comprising a graphical user interface configuration tool executed locally on the device, the graphical user interface configuration tool to configure a plurality of user attributes.

16. The system of claim 14, wherein the attributes comprise a URL for the web interface, a username, a password, a domain, at least one target resource and at least one login option.

17. The system of claim 11, further comprising a graphical user interface configuration tool being executed in a central management tool.

18. A non-transitory computer-readable medium comprising instructions that when executed cause a system to:
retrieve a configuration from a local profile associated with a user on a device, the browser extension communicating with a server via a web interface and installed on the device,
wherein the local profile comprises historical data from previous user logins to a web interface;
automatically complete a login form for the web interface based on the local profile;
in response to the automatic completion, receive user authentication information including domain membership information from a desktop delivery controller associated with the server;
identify a target resource by parsing a list of resources received from a server in response to the completed login form and the authentication information;
in response to the identification, determine whether the identified target resource exists in the local profile; and
in response to the identified target resource existing in the local profile, automatically launch the identified target resource by reading the configuration and the identified target resource from the local profile,
wherein the configuration comprises user credentials and target resources.

19. The system of claim 17, wherein the local profile is imported into the device or pushed to the device by automatic update tool.

20. The system of claim 11, wherein the target resource is a virtual desktop.

* * * * *